(12) United States Patent
Staggs, Jr.

(10) Patent No.: US 12,490,689 B1
(45) Date of Patent: Dec. 9, 2025

(54) FIRE CONTAINMENT PLATE FOR BURNING TREE STUMPS

(71) Applicant: William B. Staggs, Jr., Nashville, TN (US)

(72) Inventor: William B. Staggs, Jr., Nashville, TN (US)

( * ) Notice: Subject to any disclaimer, the term of this patent is extended or adjusted under 35 U.S.C. 154(b) by 0 days.

(21) Appl. No.: 19/214,170

(22) Filed: May 21, 2025

Related U.S. Application Data

(60) Provisional application No. 63/653,042, filed on May 29, 2024.

(51) Int. Cl.
*A01G 23/06* (2006.01)
*A62C 2/06* (2006.01)

(52) U.S. Cl.
CPC ............... *A01G 23/06* (2013.01); *A62C 2/06* (2013.01)

(58) Field of Classification Search
None
See application file for complete search history.

(56) References Cited

U.S. PATENT DOCUMENTS

| | | | |
|---|---|---|---|
| 245,179 | A | 8/1881 | Kurre |
| 593,815 | A | 11/1897 | Rickson |
| 1,347,054 | A | 7/1920 | Paxton |
| 2,939,773 | A | 6/1960 | Rymmer |
| 2,947,110 | A | 8/1960 | Walters |
| 3,168,062 | A | 2/1965 | Arnold |
| 5,134,990 | A | 8/1992 | Bradfield |

FOREIGN PATENT DOCUMENTS

EP 3991546 5/2022

OTHER PUBLICATIONS

Stump Chimney—This is how it works, https://stumpchimney.com/stump-chimney-how-it-works, May 28, 2024 (Year: 2024).*
Assembly of the Stump Chimney (Year: 2025).*
HPC, 180 deg ball and socket joints, https://shop.hpceurope.com/an/produit.asp?prid=1059 (Year: 2023).*

* cited by examiner

*Primary Examiner* — Jason Lau
(74) *Attorney, Agent, or Firm* — Shane Cortesi

(57) ABSTRACT

Fire containment plates and methods of using same are described. The fire containment plates may be metallic (made of metal) and may include a plurality of air holes, as well as a plurality of fasteners that enable the containment plate to attach to itself and form a ring around a tree stump.

16 Claims, 9 Drawing Sheets

FIRE CONTAINMENT PLATE FOR BURNING TREE STUMPS

BACKGROUND

Technical Field

The present invention relates to apparatuses for burning tree stumps.

Background of the Invention

Removal of tree stumps is costly and requires significant human involvement. Thus, there is a need for removing tree stumps that is easy and requires less human involvement.

DETAILED DESCRIPTION

Figure 1:
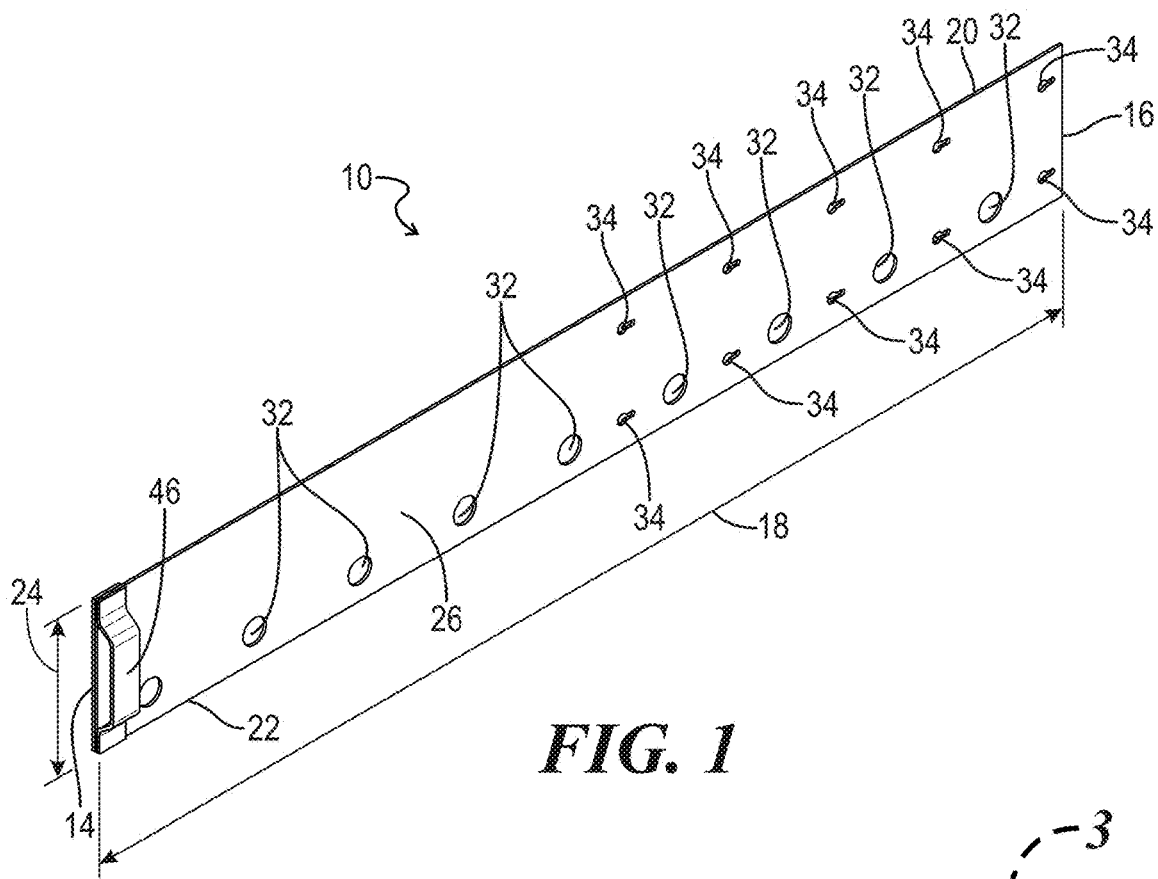
FIG. 1 illustrates a front perspective view of a flexible fire containment plate of one embodiment of the present invention.
Figure 2:
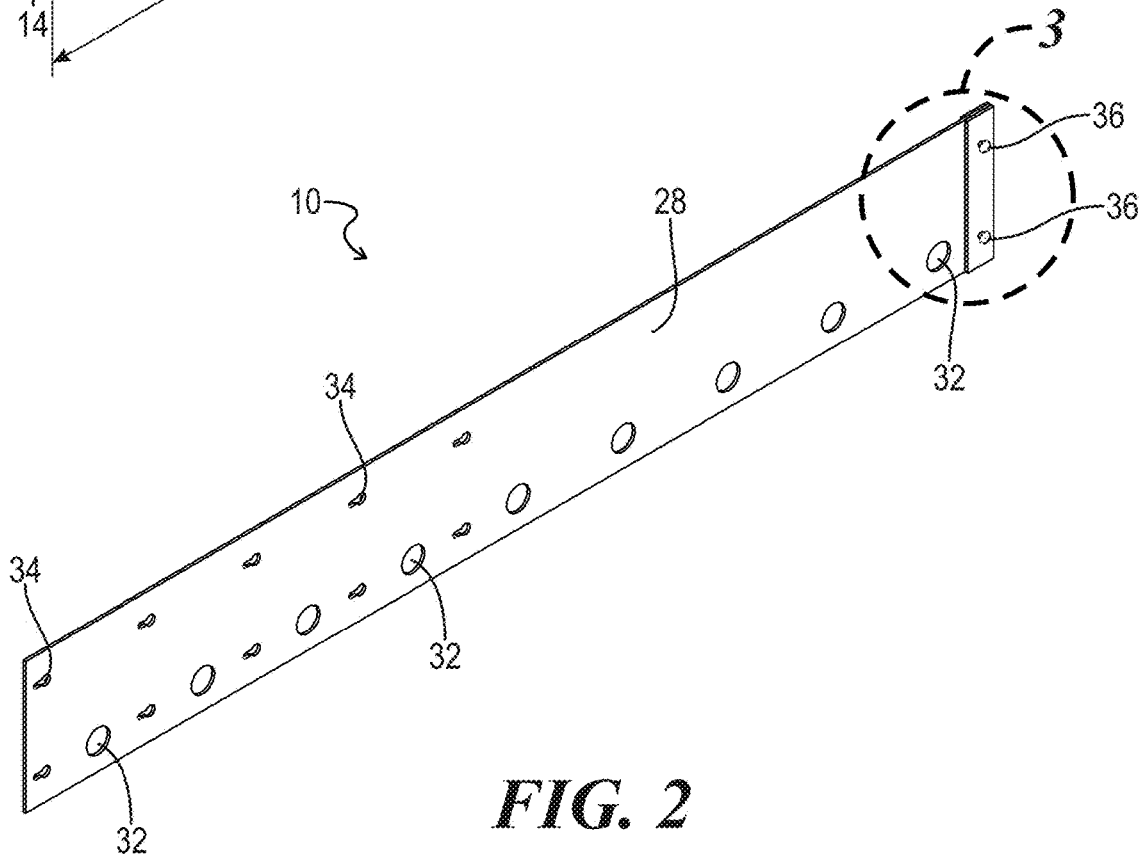
FIG. 2 illustrates a rear perspective view of the flexible fire containment plate of FIG. 1.
Figure 3:
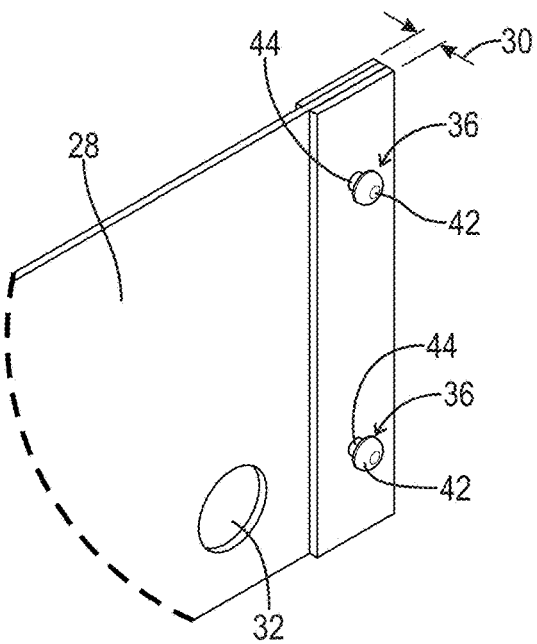
FIG. 3 illustrates a rear perspective view of the circled area labelled 3 in FIG. 2.
Figure 4:
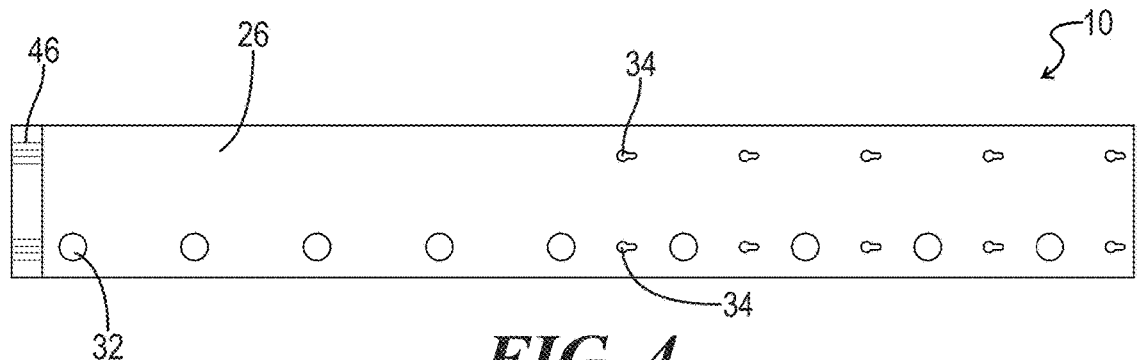
FIG. 4 illustrates a front elevation view of the flexible fire containment plate of FIG. 1.
Figure 5:
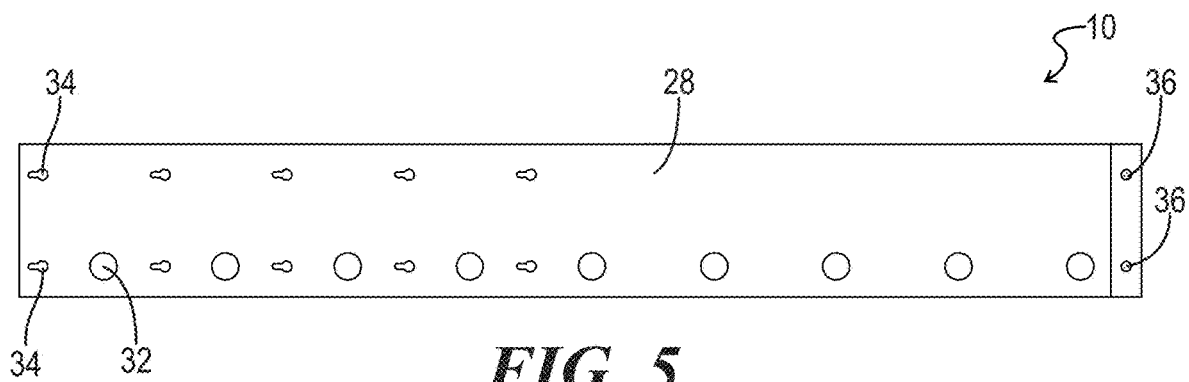
FIG. 5 illustrates a rear elevation view of the flexible fire containment plate of FIG. 1.
Figure 6:
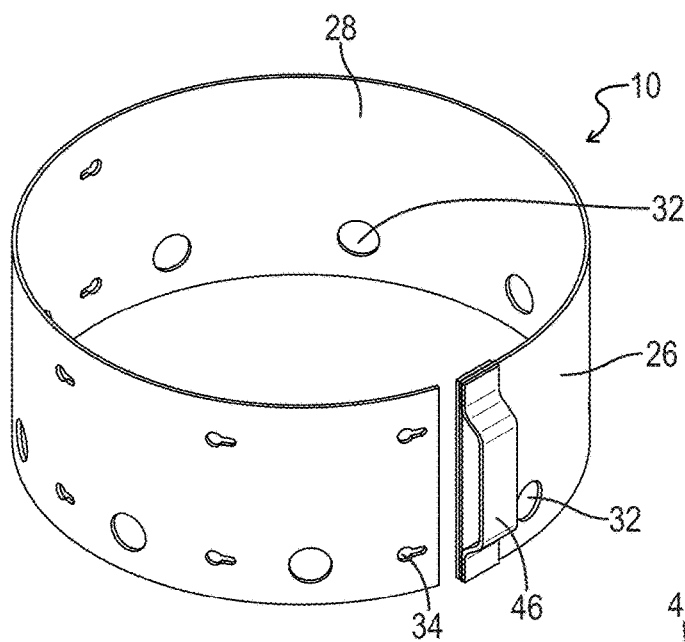
FIG. 6 illustrates a side perspective view of the flexible fire containment plate of FIG. 1 being bent onto itself.
Figure 7:
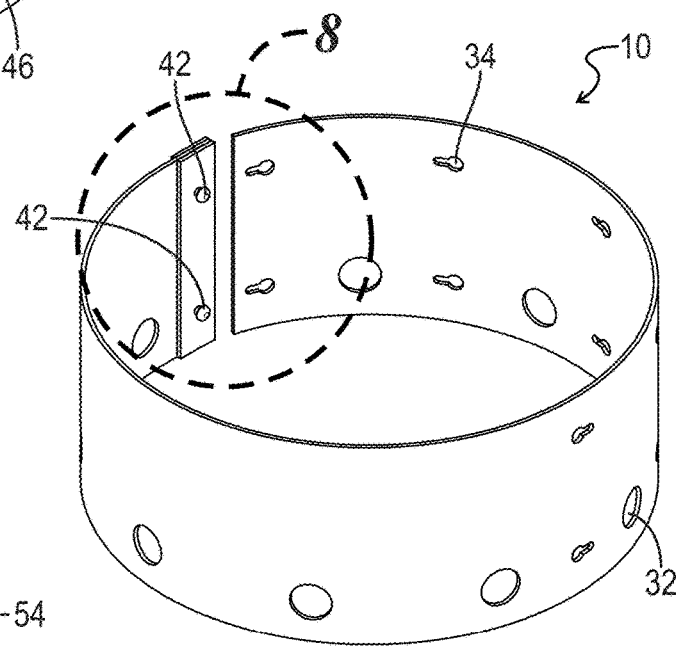
FIG. 7 illustrates another side perspective view of the flexible fire containment plate of FIG. 1 being bent onto itself.
Figure 8:
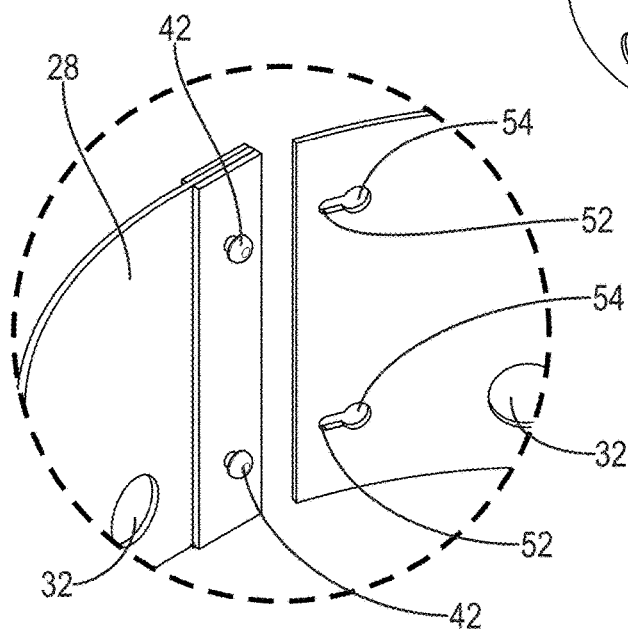
FIG. 8 illustrates a rear perspective view of the circled area labelled 8 in FIG. 7.
Figure 9:
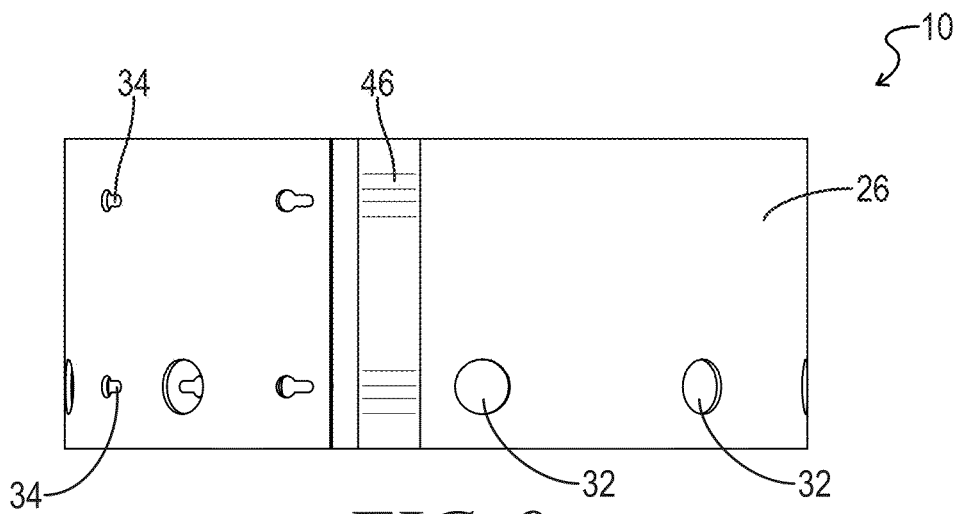
FIG. 9 illustrates a side perspective view of the flexible fire containment plate of FIG. 1 attached to itself to form a ring.
Figure 10:
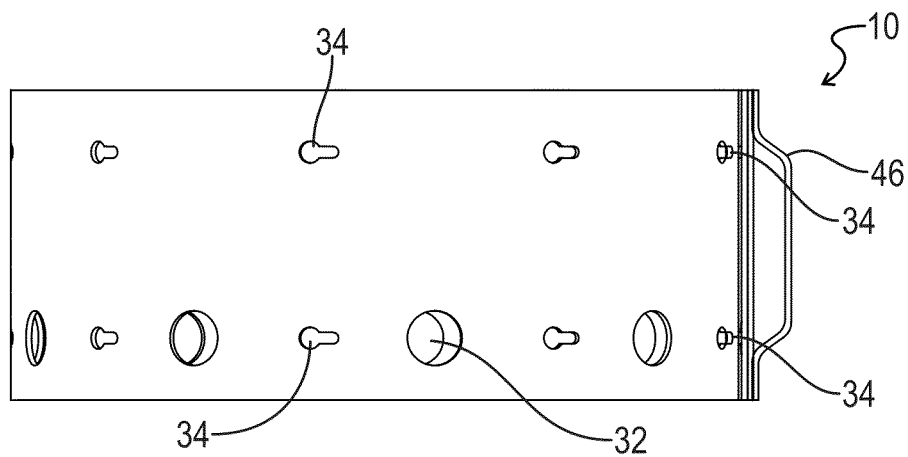
FIG. 10 illustrates another side perspective view of the ring of FIG. 9.
Figure 11:
FIG. 11 illustrates another side perspective view of the ring of FIG. 9.
Figure 12:
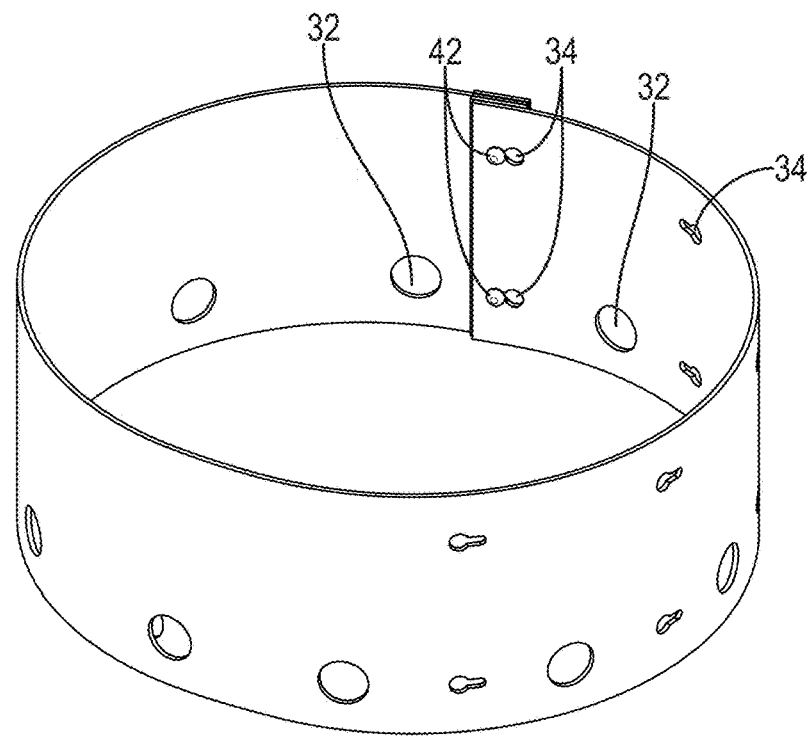
FIG. 12 illustrates another side perspective view of the ring of FIG. 9.
Figure 13:
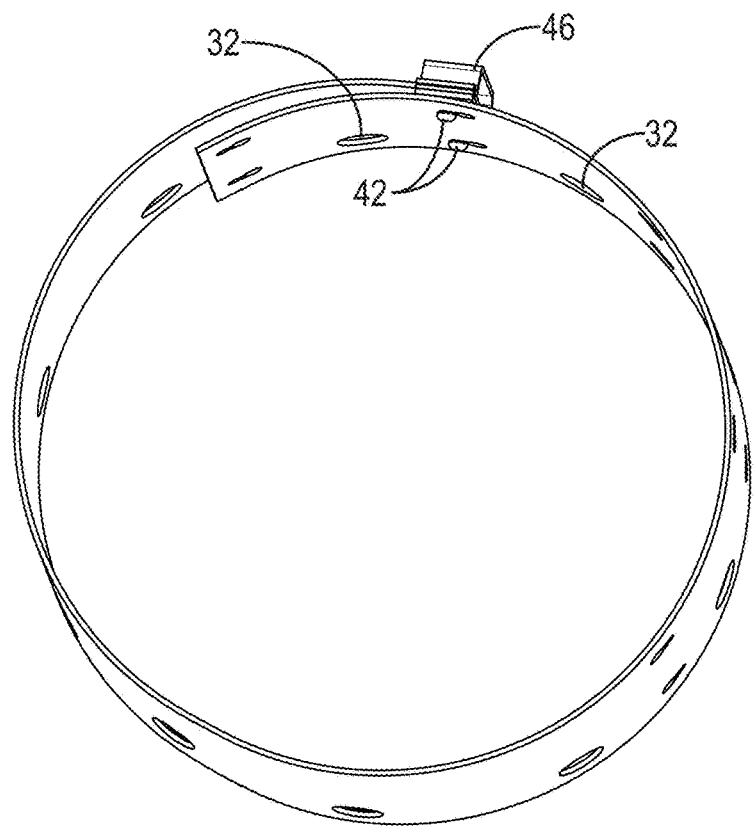
FIG. 13 illustrates a top perspective view of the ring of FIG. 9.
Figure 14:
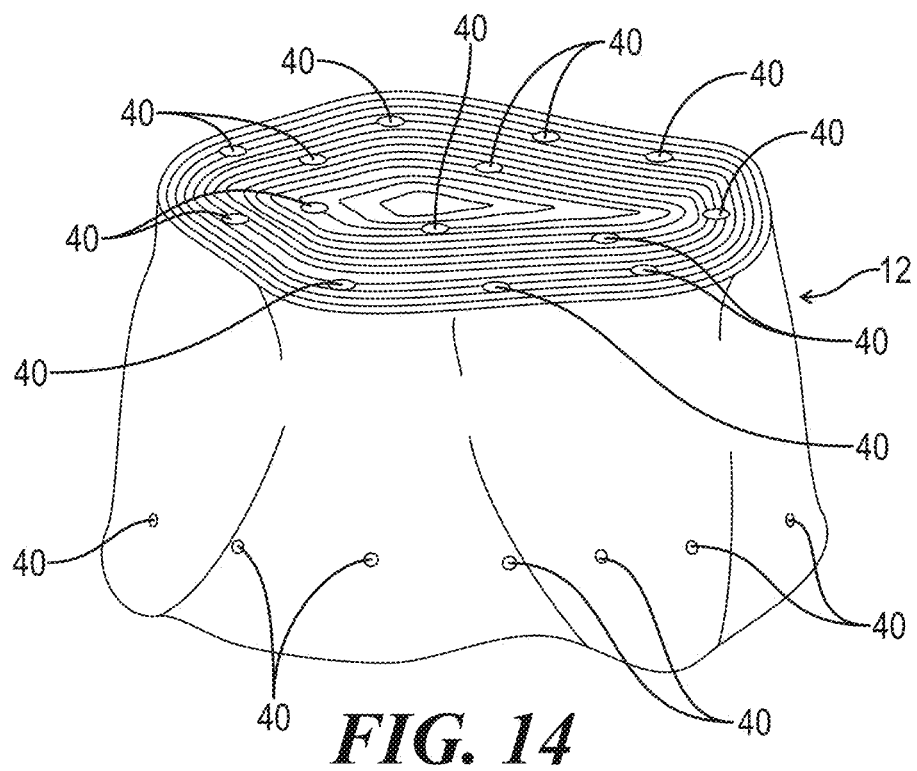
FIG. 14 illustrates a side perspective view of a tree stump with holes bored into the tree stump.
Figure 15:
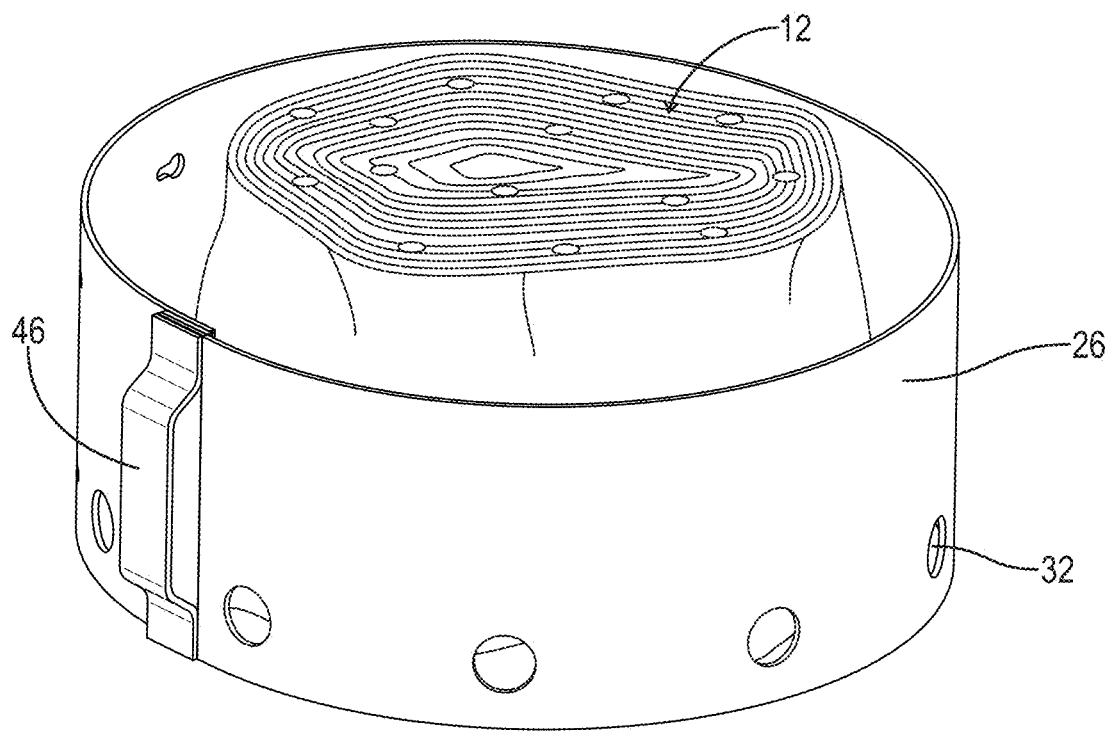
FIG. 15 illustrates a side perspective view of the tree stump of FIG. 14 with the ring of FIG. 9 encircling the tree stump.
Figure 16:
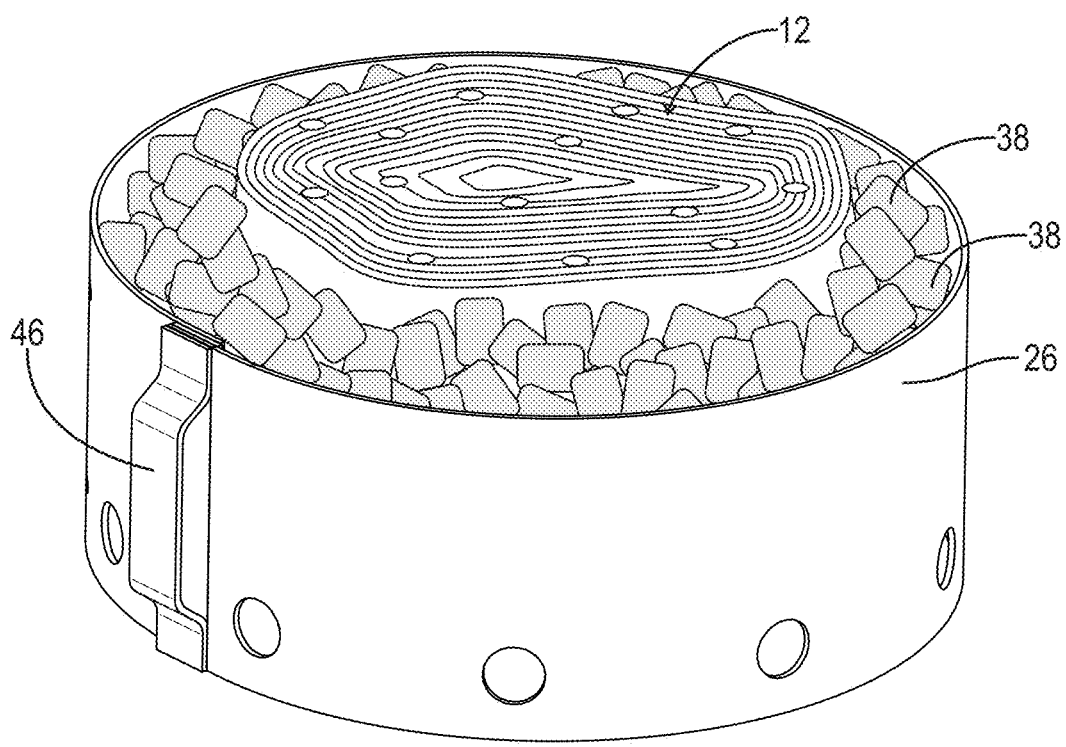
FIG. 16 illustrates a side perspective view of charcoal placed between the ring and the tree stump of FIG. 15.
Figure 17:
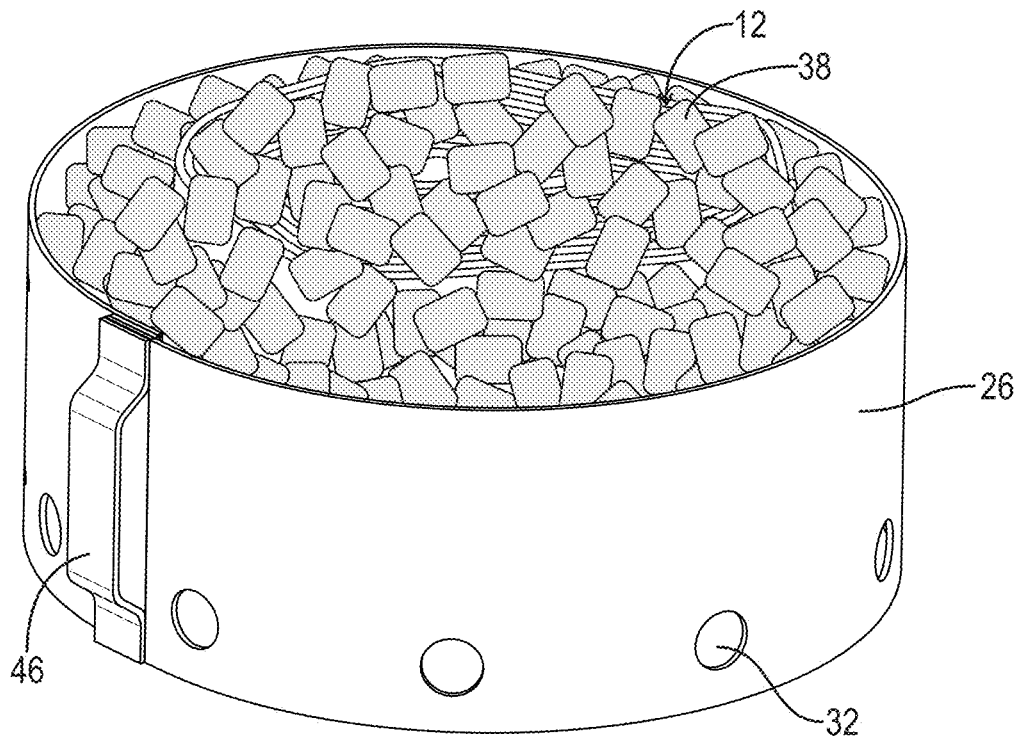
FIG. 17 illustrates a side perspective view of charcoal placed on top of the tree stump and between the ring and the tree stump of FIG. 15.

Referring to FIGS. 1-22, the present disclosure provides a flexible fire containment plate that may be made of metal (i.e., metallic) and is generally designated by the numeral 10. In the drawings, not all reference numbers are included in each drawing for the sake of clarity. Although the drawings are to scale, other dimensions are possible.

In some embodiments, referring to FIGS. 1-17 and 20-22, the present disclosure provides a method of burning a tree stump 12 comprising one or more of the following steps: a) providing a flexible metallic containment plate 10 that may comprise a proximal end 14, a distal end 16, a length 18 extending from the proximal end 14 to the distal end 16, a top 20, a bottom 22, a height 24 extending from the top 20 to the bottom 22 and perpendicular to the length 18, a front 26, a rear 28, a thickness 30 extending from the front 26 to the rear 28 and perpendicular to the length 18, a plurality of air holes 32 spaced along the length 18 and extending from the front 26 to the rear 28, and/or a plurality of fasteners 34 and 36 (which may be located on the front 26 and/or rear 28 and spaced along the length 18); b) positioning the flexible metallic containment plate 10 around a tree stump 12 and removably attaching the flexible metallic containment plate 10 to itself by, e.g., removably attaching at least one fastener 34/36 of the flexible metallic containment plate 10 to at least one other fastener 34/36 of the flexible metallic containment plate 10 to encircle the tree stump 12 with the flexible metallic containment plate 10; c) placing a fuel source 38 between the flexible metallic containment plate 10 and the tree stump 12 and/or on top of the tree stump 12; and/or d) igniting the fuel source 38 so that the tree stump 12 begins to burn. Optionally, as shown in FIGS. 1-17 and 20-22, the plurality of fasteners comprise i) a plurality of fastener holes 34 extending from the front 26 to the rear 28 and spaced along the length 18 and ii) at least one protrusion 36 configured to removably attach to a fastener hole 34. Optionally, as shown in FIGS. 1-2 and 4-7 (for example), the plurality of fastener holes 34 are spaced substantially equally apart along the length 18. Optionally, as shown in FIGS. 1-2 and 4-7 (for example), the plurality of fastener holes 34 comprise a top row of fastener holes 34 and a bottom row of fastener holes 34 located below the top row of fastener holes 34. Optionally, as shown in FIGS. 1-2 and 4-7 (for example), the at least one protrusion 36 comprises a top row of protrusions 36 aligned along the height 24 with the top row of fastener holes 34 and a bottom row of protrusions 36 located below the top row of protrusions 36 and aligned along the height 24 with the bottom row of fastener holes 34. Optionally, as shown in FIGS. 1-2 and 4-7 (for example), all the fastener holes 34 in the top row are aligned (lengthwise) with a fastener hole 34 in the bottom row.

Optionally, as shown in FIGS. 1-17 and 20-22 (for example), the plurality of fastener holes 34 are in the shape of a notch/key (e.g., comprising a circular hole 54 and a slot 52 extending from the circular hole 54) and the at least one protrusion 36 comprises a circular head 42 and a shaft 44 extending from the circular head 42 to removably lock the flexible metallic containment plate 10 to itself. For example, optionally, as shown in FIGS. 7, 8 and 12-13 (for example) step b) comprises placing the circular head 42 into the circular hole 54 and then sliding the circular head 42 into the slot 52 to releasably lock the circular head 42 into the slot 52.

Optionally, as shown in FIGS. 1-17 and 20-22 (for example), the front 26 comprises a handle 46 and further wherein the at least one protrusion 36 is located on the rear 28. Optionally, the handle 46 is adjacent to the proximal end 14.

Optionally, as shown in FIGS. 1-17 and 20-22 (for example), the air holes 32 are spaced substantially equally apart.

Optionally, the method further comprises flowing air through the air holes 32 to provide oxygen to the fuel source 38 as the tree stump 12 begins to burn. Optionally, the fuel source 38 comprises charcoal. Optionally, the method further comprises drilling holes 40 in the tree stump 12 before or after step b). Optionally, as shown in FIGS. 1-5 (for example) the flexible metallic containment plate 10 of step a) is rectangular in shape. Optionally, as shown in FIGS. 12-13 and 16-17 (for example) the flexible metallic containment plate 10 of step b) is in the shape of a ring.

Figure 20:
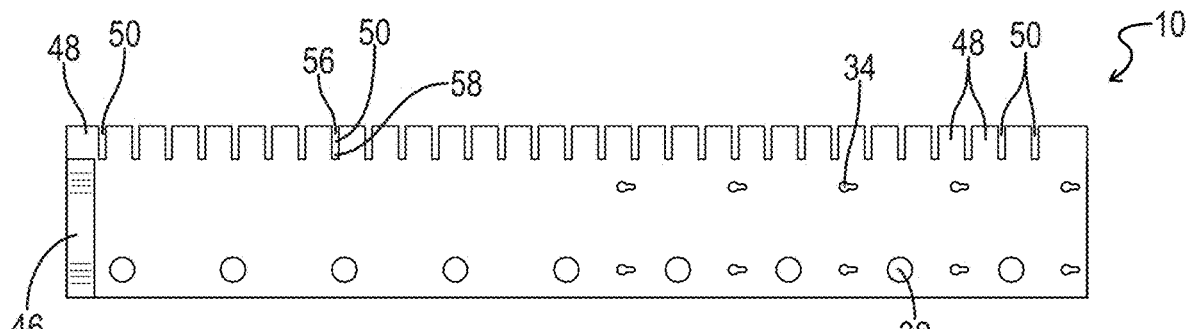
FIG. 20 illustrates a front perspective view of a flexible fire containment plate of another embodiment of the present invention.
Figure 21:
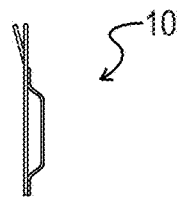
FIG. 21 illustrates a proximal end elevation view of the flexible fire containment plate of FIG. 20 with the proximal tab being bent rearwardly.
Figure 22:
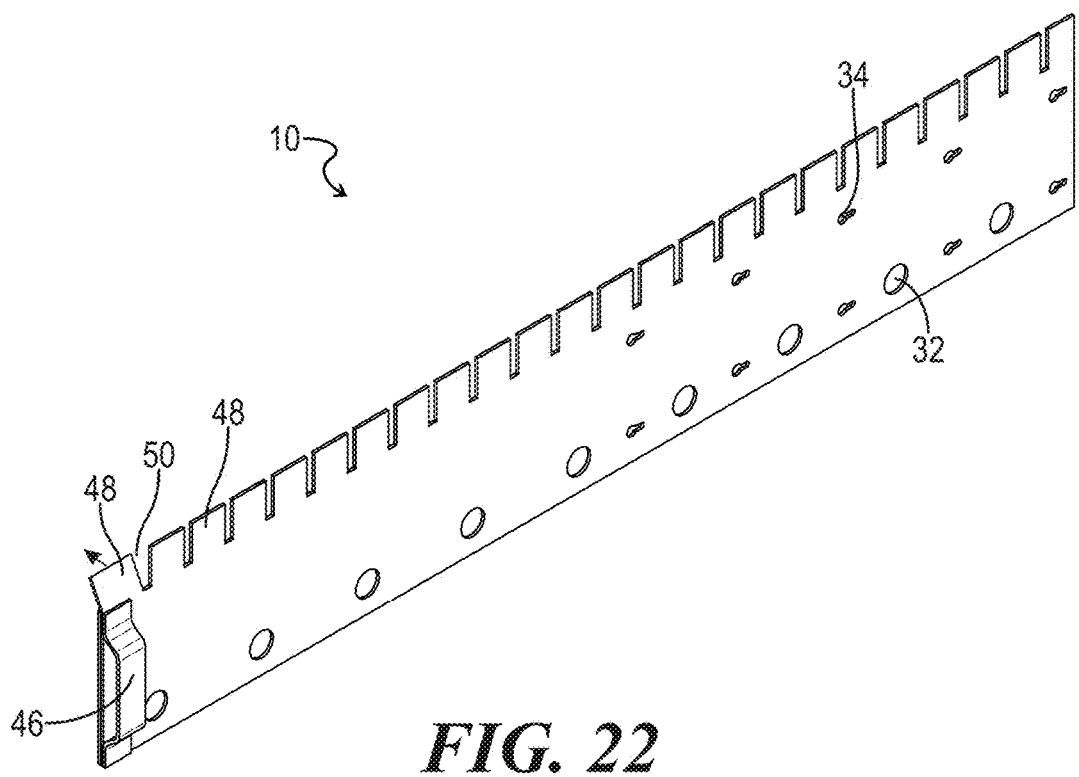
FIG. 22 illustrates a front perspective view of the flexible fire containment plate of FIG. 20 with the proximal tab being bent rearwardly.

Optionally, the ring of step b) comprises a top and a bottom and further wherein the cross-sectional area of the top is less than the cross-sectional area of the bottom (e.g., a tapered top/funnel) to facilitate burning. For example, as shown in FIGS. 20-22, optionally, the top of the flexible metallic containment plate 10 comprises a plurality of tabs 48 separated by slits 50 spaced along the length 18, the slits 50 comprising a slit top located at the plate top 20 and a slit bottom located below the plate top 20 and above the plate bottom 22, and the method further comprises bending one or more tabs 48 (to create a funnel).

The air holes 32 can be any suitable shape, including, for example, circular as shown in the illustrations, or alternatively, the air holes 32 may be, for example, a pattern of triangle-shaped indentations (not shown) in the top 20 and/or bottom 22 of the flexible metallic containment plate 10.

Figure 18:
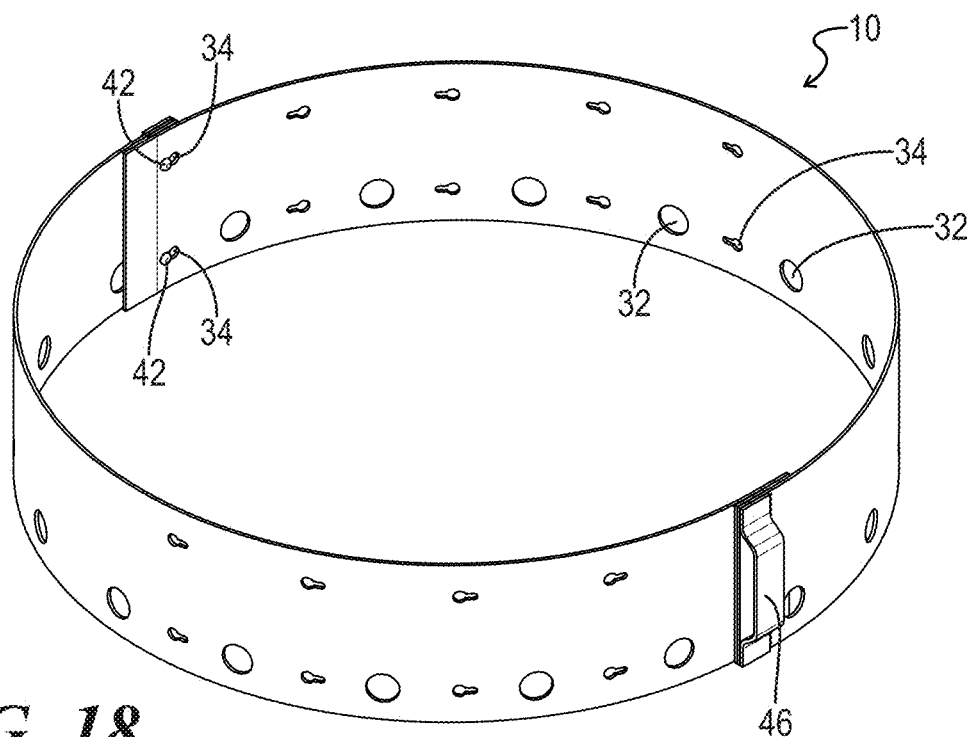
FIG. 18 illustrates a side perspective view of two flexible fire containment plates attached to each other in accordance with one embodiment of the present invention to form an oversized ring.
Figure 19:
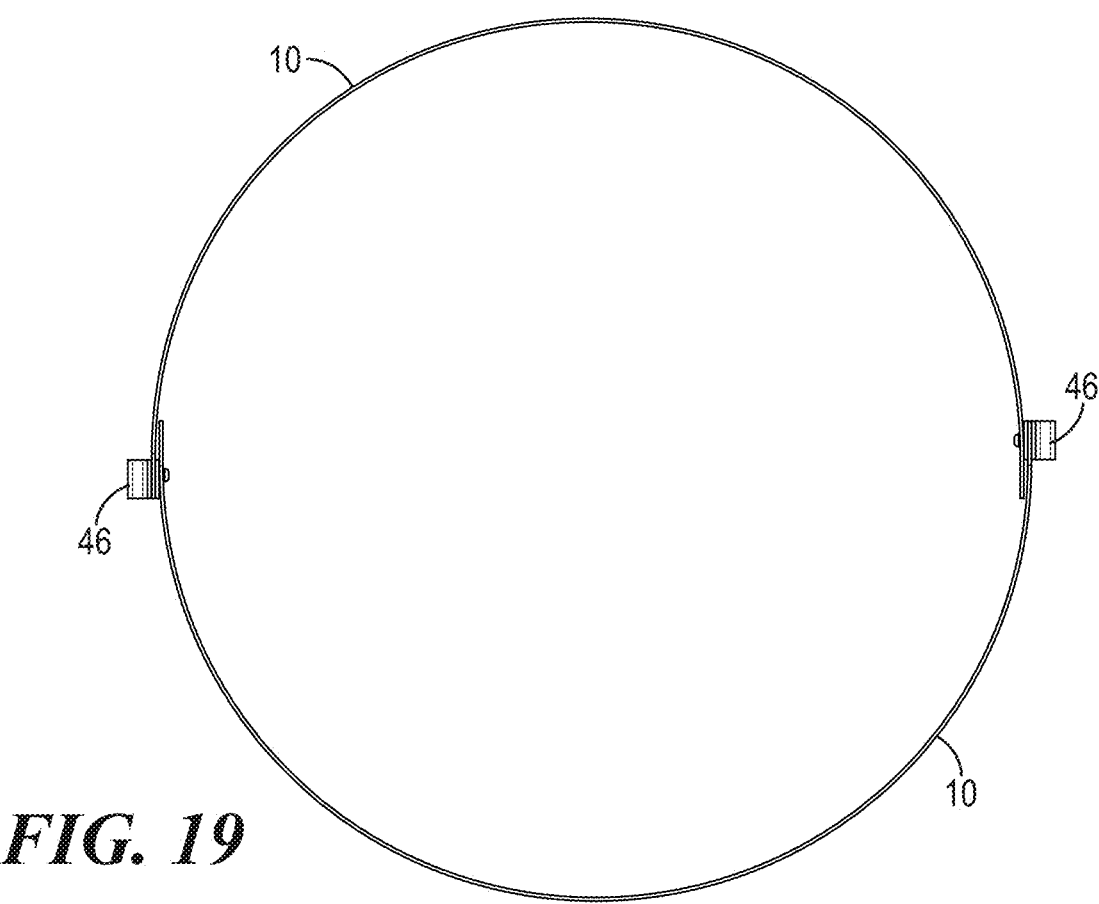
FIG. 19 illustrates a top perspective view of the oversized ring of FIG. 18.

In still further embodiments, as shown in FIGS. 18-19, the method may involve providing a plurality of flexible metallic containment plates 10 and removably attaching a flexible metallic containment plate 10 to another flexible metallic containment plate 10 by attaching at least one fastener 34/36 of one flexible metallic containment plate 10 to at least one other fastener 34/36 of another flexible metallic containment plate 10 to encircle the tree stump 12 with the flexible metallic containment plates 10.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about", and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method of burning a tree stump comprising:
   a) providing a flexible metallic containment plate comprising: a proximal end, a distal end, a length extending from the proximal end to the distal end, a top, a bottom, a height extending from the top to the bottom and perpendicular to the length, a front, a rear, a thickness extending from the front to the rear and perpendicular to the length, a plurality of air holes spaced along the length and extending from the front to the rear, and a plurality of fasteners, wherein the plurality of fasteners comprise a plurality of fastener holes extending from the front to the rear and spaced along the length and at least one protrusion configured to removably attach to a fastener hole, and further wherein each of the plurality of fastener holes comprise a circular hole and a slot extending from the circular hole and each protrusion comprises a circular head and a shaft extending from the circular head;
   b) positioning the flexible metallic containment plate around a tree stump;
   c) placing a circular head into a circular hole and then sliding the circular head into a slot to releasably lock the circular head into the slot to removably attach the flexible metallic containment plate to itself;
   d) placing a fuel source between the flexible metallic containment plate and the tree stump and/or on top of the tree stump; and
   e) igniting the fuel source so that the tree stump begins to burn.

2. The method of claim 1 wherein the plurality of fastener holes are spaced substantially equally apart along the length.

3. The method of claim 1 wherein the plurality of fastener holes comprise a top row of fastener holes and a bottom row of fastener holes located below the top row of fastener holes, and further wherein the at least one protrusion comprises a top row of protrusions aligned along the height with the top row of fastener holes and a bottom row of protrusions located below the top row of protrusions and aligned along the height with the bottom row of fastener holes.

4. The method of claim 3 wherein some or all the fastener holes in the top row are aligned with a fastener hole in the bottom row.

5. The method claim 1 wherein the front comprises a handle and further wherein the at least one protrusion is located on the rear, wherein the handle comprises a handle top and a handle bottom, and a handle middle section located between the handle top and the handle bottom, the handle top and the handle bottom attached to the rear, the handle middle section extending parallel to the height, the handle top, the handle bottom and the handle middle section forming a closed cavity configured to receive a human's hand.

6. The method of claim 5 wherein the handle is adjacent to the proximal end.

7. The method of claim 1 wherein the air holes are spaced substantially equally apart along the length.

8. The method of claim 1 wherein the method further comprises flowing air through the air holes to provide oxygen to the fuel source as the tree stump begins to burn.

9. The method of claim 1 wherein the fuel source comprises charcoal.

10. The method of claim 1 wherein the method further comprises drilling holes in the tree stump before or after step b).

11. The method of claim 1 wherein the flexible metallic containment plate of step a) is rectangular in shape.

12. The method of claim 1 wherein the flexible metallic containment plate of step b) is in the shape of a ring.

13. The method of claim 1 wherein the top of the flexible metallic containment plate comprises a plurality of tabs separated by slits spaced along the length, the slits comprising a slit top located at the plate top and a slit bottom located below the plate top and above the plate bottom, and the method further comprises bending one or more tabs.

14. The method of claim 1, wherein, in step b), each of the heads face the tree stump.

15. The method of claim 1, wherein, in step a), the flexible metallic containment plate is straight along the length of the flexible metallic containment plate, and
    wherein after steps b) and c), the flexible metallic containment plate curves inwardly and continuously and at least partially rolls around itself to form a closed ring around the tree stump.

16. The method of claim 1 wherein, after steps b) and c), the rear of the flexible metallic containment plate faces the tree stump and, wherein the front of one of the proximal end and the distal end confronts the rear of the flexible metallic containment plate.

* * * * *